(12) United States Patent
Murgia et al.

(10) Patent No.: US 10,867,527 B2
(45) Date of Patent: Dec. 15, 2020

(54) PROCESS AND WEARABLE DEVICE EQUIPPED WITH STEREOSCOPIC VISION FOR HELPING THE USER

(71) Applicant: 5LION HORUS TECH LLC, McLean, VA (US)

(72) Inventors: Saverio Murgia, Vado Ligure (IT); Luca Nardelli, Lavis (IT)

(73) Assignee: 5LION HORUS TECH LLC., McLean, VA (US)

( * ) Notice: Subject to any disclaimer, the term of this patent is extended or adjusted under 35 U.S.C. 154(b) by 39 days.

(21) Appl. No.: 15/506,935

(22) PCT Filed: Aug. 31, 2015

(86) PCT No.: PCT/IB2015/056591
§ 371 (c)(1),
(2) Date: Feb. 27, 2017

(87) PCT Pub. No.: WO2016/034999
PCT Pub. Date: Mar. 10, 2016

(65) Prior Publication Data
US 2017/0249863 A1 Aug. 31, 2017

(30) Foreign Application Priority Data
Sep. 1, 2014 (IT) .............................. TN2014A0021

(51) Int. Cl.
*H04N 13/239* (2018.01)
*G09B 21/00* (2006.01)
(Continued)

(52) U.S. Cl.
CPC ....... *G09B 21/008* (2013.01); *G02B 27/0172* (2013.01); *G02C 5/001* (2013.01);
(Continued)

(58) Field of Classification Search
CPC ......... G02C 11/10; G02C 5/001; G06F 1/163; G06F 3/013; G06K 9/00; G06K 9/344;
(Continued)

(56) References Cited

U.S. PATENT DOCUMENTS 6,115,482 A * 9/2000 Sears ...................... G06F 3/011
348/62
7,806,525 B2 10/2010 Howell
(Continued)

FOREIGN PATENT DOCUMENTS

| EP | 2371339 | 10/2011 |
|---|---|---|
| EP | 2629241 | 8/2013 |

(Continued)

*Primary Examiner* — Christopher S Kelley
*Assistant Examiner* — Kathleen M Walsh
(74) *Attorney, Agent, or Firm* — Brundidge & Stanger, P.C.

(57) ABSTRACT

Wearable device for helping a user and process for using such device, which device includes at least one image and/or video acquisition unit of the stereoscopic or multicamera type, a data processing unit connected to the image and/or video acquisition unit, and a unit indicating information processed by the processing unit to the user. The device also includes additional sensors connected to the processing unit and is intended to perform a plurality of functions, which are activated and/or deactivated for defining a plurality of device operating states alternative to each other, there being provided a unit analyzing the three-dimensional structure of a scene and the signals generated by the sensors for assigning the operating state.

24 Claims, 7 Drawing Sheets

(51) Int. Cl.
*G06K 9/00* (2006.01)
*G02C 5/00* (2006.01)
*G06F 3/03* (2006.01)
*G06F 3/0346* (2013.01)
*G02B 27/01* (2006.01)
*H04N 13/344* (2018.01)
*G02C 11/00* (2006.01)
*G06K 9/34* (2006.01)
*G06K 9/62* (2006.01)
*G06F 1/16* (2006.01)

(52) U.S. Cl.
CPC ............ *G02C 11/10* (2013.01); *G06F 3/0304* (2013.01); *G06F 3/0346* (2013.01); *G06K 9/00* (2013.01); *G06K 9/344* (2013.01); *G06K 9/6256* (2013.01); *G06K 9/6267* (2013.01); *H04N 13/239* (2018.05); *H04N 13/344* (2018.05); *G02B 2027/014* (2013.01); *G02B 2027/0138* (2013.01); *G06F 1/163* (2013.01); *H04N 2213/008* (2013.01)

(58) Field of Classification Search
CPC .. G06K 9/6256; G06K 9/6267; G09B 21/008; H04N 2213/008; H04N 13/0239; H04N 13/044; H04N 13/239; H04N 13/344
USPC ............................................ 348/47; 382/114
See application file for complete search history.

(56) References Cited

U.S. PATENT DOCUMENTS

| | | | | |
|---|---|---|---|---|
| 2006/0098089 A1* | 5/2006 | Sofer | ............ | G09B 21/006 348/62 |
| 2007/0008484 A1* | 1/2007 | Jannard | ............ | H04M 1/05 351/41 |
| 2010/0194860 A1* | 8/2010 | Mentz | ............ | H04N 5/2252 348/47 |
| 2011/0213664 A1* | 9/2011 | Osterhout | ............ | G06F 3/013 705/14.58 |
| 2012/0062357 A1* | 3/2012 | Slamka | ............ | G09B 21/006 340/4.11 |
| 2012/0072387 A1* | 3/2012 | Yanase | ............ | G06F 16/907 706/50 |
| 2013/0131985 A1* | 5/2013 | Weiland | ............ | G08B 3/00 701/516 |
| 2013/0271584 A1* | 10/2013 | Wexler | ............ | G06K 9/00355 348/62 |
| 2014/0085446 A1* | 3/2014 | Hicks | ............ | G09B 21/008 348/62 |
| 2014/0253701 A1* | 9/2014 | Wexler | ............ | G09B 21/008 348/62 |
| 2014/0267651 A1* | 9/2014 | Wexler | ............ | G06K 9/00671 348/62 |
| 2014/0347265 A1* | 11/2014 | Aimone | ............ | A61M 21/00 345/156 |
| 2015/0002808 A1* | 1/2015 | Rizzo, III | ............ | G02C 11/10 351/158 |
| 2015/0054716 A1* | 2/2015 | Hirabayashi | ............ | G02B 27/01 345/8 |
| 2015/0201181 A1* | 7/2015 | Moore | ............ | G06F 3/016 348/47 |
| 2016/0033280 A1* | 2/2016 | Moore | ............ | G06K 9/00671 701/472 |
| 2018/0131791 A1* | 5/2018 | Fisher | ............ | H04M 1/0216 |

FOREIGN PATENT DOCUMENTS

| | | |
|---|---|---|
| WO | 2012114123 | 8/2012 |
| WO | 2014140838 | 9/2014 |

* cited by examiner

PROCESS AND WEARABLE DEVICE EQUIPPED WITH STEREOSCOPIC VISION FOR HELPING THE USER

The present invention relates to a wearable device for helping a user, comprising at least one image and/or video acquisition unit, a data processing unit connected to the image and/or video acquisition unit and a unit indicating information processed by the processing unit to the user.

TECHNICAL FIELD THE INVENTION RELATES TO

The present invention comprises a wearable device for helping a user, particularly helping vision. Aspects of the present invention relate to the processing of a visual signal and to automatic learning field.

PRIOR ART

Eyesight loss or worsening, in people suffering therefrom, causes a serious series of problems in everyday life: mobility reduction, risk of getting hurt, loss in independence and ability of interpreting what occurs around them.

There are many products for individually solving some of such problems: navigation systems based on global positioning system (GPS), systems detecting obstacles during movement, devices for reading and vocal interaction with personal computer. There are devices that by means of visual processing techniques are able to satisfy some of such problems, however they are limited in analysing the scene due to their structure. Particularly, the presence only of one video camera makes the perception of the three-dimensional structure of the scene too much difficult.

Technical Problem

The problem desired to be solved is to improve reliability and functionalities of a device helping a user, particularly helping vision.

Solution of the Technical Problem

The present invention aims at solving said technical problem and at overcoming prior art drawbacks mentioned above by a device as described hereinbefore, where in addition the image and/or video acquisition unit is of stereoscopic or multicamera type.

A device equipped with stereoscopic or multicamera vision can pave the way to new possibilities of interaction with the world.

The device is able to fully employ the stereoscopic or multicamera visual processing, for example for helping blind and visually impaired people in everyday life.

The processing unit is equipped with a programmable CPU, intended to analyse the acquired images and/or videos, by estimating the three-dimensional structure of the scene observed through the acquisition units, such to detect objects of interest; moreover the processing unit is equipped with mass memory.

The device comprises also further sensors connected to said processing unit and it is intended to perform a plurality of functionalities, which functionalities are activatable and/or deactivatable for defining a plurality of device operating states alternative to each other, there being provided a unit analysing the three-dimensional structure of the scene and the signals generated by said sensors for assigning the operating state.

Therefore the device has the great advantage of analysing or merging information deriving from the sensors such to understand the context around the user and to evaluate the user's intentions.

On the basis of such analysis and evaluation, the device takes different discrete operating states, each operating state being characterized by different functionalities.

In one embodiment said further sensors comprise at least one microphone.

In a further embodiment said further sensors comprise at least one inertial sensor. Such sensor for example can be an accelerometer. Preferably the inertial sensor is an IMU, such as six-axis IMU comprising accelerometers and gyroscopes or nine-axis IMU comprising also a magnetometer.

In one embodiment there is provided a database of known objects and there are provided learning means for said database.

In one embodiment the indication unit comprises one or more loudspeakers.

In a first variant embodiment the loudspeakers comprise at least one earphone.

In a second variant embodiment the loudspeakers comprise a bone conduction sound system. Bone conduction uses conduction of sound to the inner ear through the skull bones. For example it allows external noises not to be blocked, since the auditory canal is kept free.

In one embodiment there is provided a control interface connected with the processing unit, which control interface provides one or more buttons and/or one or more microphones in combination with a voice message recognition unit.

In one embodiment the image and/or video acquisition unit comprises at least two video cameras arranged along a vertical or substantially vertical axis with the device in the worn condition.

This allows having a reduced encumbrance along a horizontal plane.

In a further embodiment there is provided a supporting frame provided with two ends resting on the user's ears and with a connection body intended to be placed behind the user's nape, the acquisition unit being placed near one end.

Such arrangement is very advantageous since it allows not having obstructions on the face and in front of the eyes, with a considerable increase in comfort and in aesthetical appearance of the user. The combination of such arrangement with the vertical arrangement of the video cameras has a synergic effect that allows not having obstructions on the face and at the same time not having elements protruding too much from the head. The image and/or video acquisition unit is provided near one ear, but since it is provided with vertically arranged video cameras it has a small thickness in the lateral direction with respect to the face and therefore it allows very small encumbrance to be provided.

In an alternative embodiment the device can be coupled to a pair of eyeglasses by a coupling system.

The present invention further relates to a process for the operation of a wearable device for helping a user; the device is intended to perform several functionalities, which functionalities are activated and/or deactivated for defining a plurality of device operating states alternative to each other; the method comprises the following steps:

a) acquiring one or more images and/or videos in the stereoscopic or multicamera mode, which images and/or videos represent a scene;

b) processing the images and/or videos such to obtain the three-dimensional structure of the scene;

c) identifying the objects in the scene by isolating them with respect to the background;

d) indicating the defined objects to the user;

e) detecting signals from further sensors;

f) analysing in real-time the detected signals and the three-dimensional structure of the scene;

g) assigning or keeping the operating state on the basis of the performed analysis.

In one embodiment a recording of sound signals and processing of the user speech are carried out, such to set one or more of the above steps.

In one embodiment identifying the objects provides to detect characteristic features of an object in the image and/or a to search for characteristic features of an object that correspond with each other in the several video frames, and to group together the characteristic features into homogeneous groups.

In this case the main points of the scene are extracted, grouped in clusters by likeness, and these latter are considered as objects. Such operation can be used for recognizing the objects or for tracking the object motion, by a three-dimensional motion analysis.

In one embodiment there is provided a system managing a database of known objects, and a system for learning said objects.

In one embodiment the identified objects are classified by the device by means of one or more classifiers with reference to a database of known objects, there being provided a learning of unknown identified objects by storing the characteristic features of such unknown identified objects in said database.

In a further embodiment for each unknown identified object the user is asked to pronounce the name of the object, and the pronounced name is stored in association with the characteristic features.

This allows speech recognition system to be trained on the specific voice timbre of the user, such to refine the performances.

In one embodiment the objects isolated from the background are analysed to evaluate whether they contain alphanumeric characters, which alphanumeric characters are automatically defined and read to the user by OCR technology.

In one embodiment, if a plurality of alphanumeric characters groups is present, a priority value is assigned to each group on the basis of some objective criteria, among which the distance of the group from the fixation point, which fixation point is defined as the centre of the acquired image, the dimension of the character or the distance from the user. These groups of characters finally are read in the priority order.

The present invention further relates to eyeglasses frame for helping the user with side arms and a wearable device integrated within said side arms, with the above characteristics and operating according to the described process.

DESCRIPTION OF ONE OR MORE EMBODIMENTS

The suggested solution is a wearable device, equipped with stereoscopic or multicamera vision system, data processing systems, microphones and buttons. The system receives commands by the user pressing the buttons or by speech commands, then audibly communicating with the user by a bone conduction system. The presence of said vision system guarantees in any moment the possibility of acquiring stereoscopic or multicamera video sequences or images, that after suitable processing provide three-dimensional information about the observed scene. All such device functionalities are made possible by the process of the invention.

In addition to the embodiment suggested in this document, the three-dimensionality perception can be obtained as an alternative or in combination by using other phenomena. It would be possible to obtain such information by calculating the apparent motion of the objects in the scene, or by using the shadows generated by a light source, or by using active visual systems such as for example by projecting additional information in the scene, then using them in the evaluation step.

Before explaining characteristics or examples of use of the invention, it is necessary to specify that this invention is not limited in its applications to the provided details and to the components mentioned in the description below. The invention can have other characteristics and its functions can be performed in different manners. Moreover the terms used from now on have not to be considered as a limitation since are used only by way of example.

This document describes several methods for helping a person in the vision by using a wearable device.

Advantages

The invention allows life of visually impaired people to considerably improve. Vocal interaction is one of the most natural and typical ones of human nature, therefore a device that can interact in this manner surely is more intuitive and easy to be used by the user, it being characterized as a personal assistant always available and able to learn.

Pressing the buttons remains as a possible alternative since it can be comfortable as a replacement for the mere speech command.

The use of a stereoscopic or multicamera vision system can allow the device to have a much more deep knowledge of the surrounding reality, making it possible to transmit to the user such perception much more rich with information. The higher complexity of such obtained information allows the device to analyse the scene at a higher level, it being able to take decisions in a manner more like a real personal assistant.

The important learning ability of the device is one of the main points of force of the invention. Thus the device can more and more adapt itself to user's life, remembering his/her objects, people he/she knowns, and therefore it being able to optimize the automatic recognition process, working on a set of typical items for the user in question.

These and other characteristics and advantages of the present invention will be more clear from the following description of some embodiments shown in the annexed drawings wherein.

The device, wearable by the user, provides a data processing unit 2 connectable with a stereoscopic or multicamera image and/or video acquisition unit 1. The processing unit 2 can receive images or video sequences from the stereoscopic or multicamera image and/or video acquisition unit 1, which images or video sequences are processed in order to provide information required by the user. By using stereoscopy the device can distinguish bodies in foreground from those in background, and therefore it can perform different actions depending on the command given by the user and on the context.

The device is also equipped with mass memory system, used for all the purposes requiring data storage.

Figure 1:
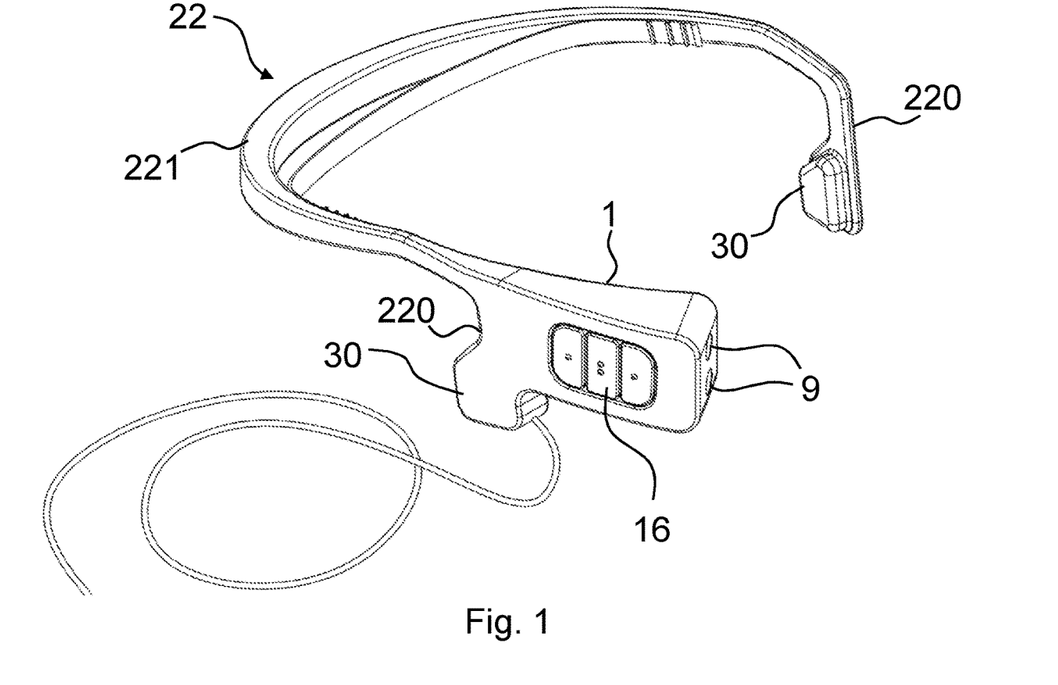
FIGS. 1 and 2 are two different views of a first embodiment of the device.
Figure 2:
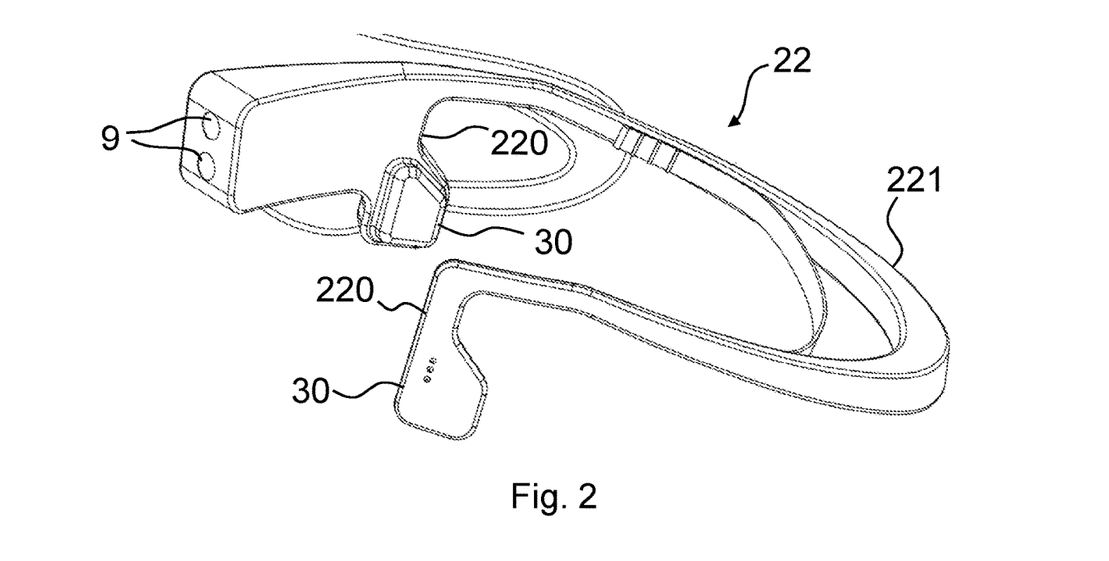
Figure 3:
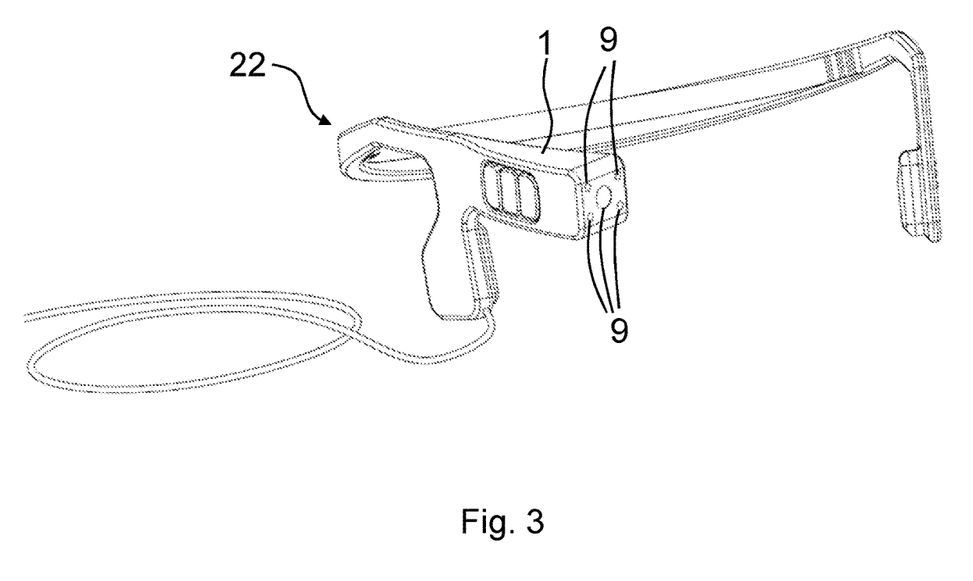
FIG. 3 is a second embodiment of the device.

In the example of FIGS. 1, 2 and 3 the device comprises a supporting frame 22 provided with two ends 220 resting on the user's ears and a connection body 221 intended to be placed behind the user's nape. The acquisition unit 1 is placed near one of the two ends 220.

In FIGS. 1 and 2 the image and/or video acquisition unit 1 comprises two video cameras 9 arranged along a vertical axis with the device in the worn condition.

The device is provided with two bone conduction sound systems 30, placed such to lean on the user in the region of the temples with the device in the worn condition.

In the embodiment of FIG. 3, the image and/or video acquisition unit 1 comprises five video cameras 9 for multicamera acquisition. The arrangement of the embodiment in the figure provides a central video camera 9 and four video cameras 9 placed at the vertices of a square placed around the central video camera. This is an example of a multicamera system.

Figure 4:
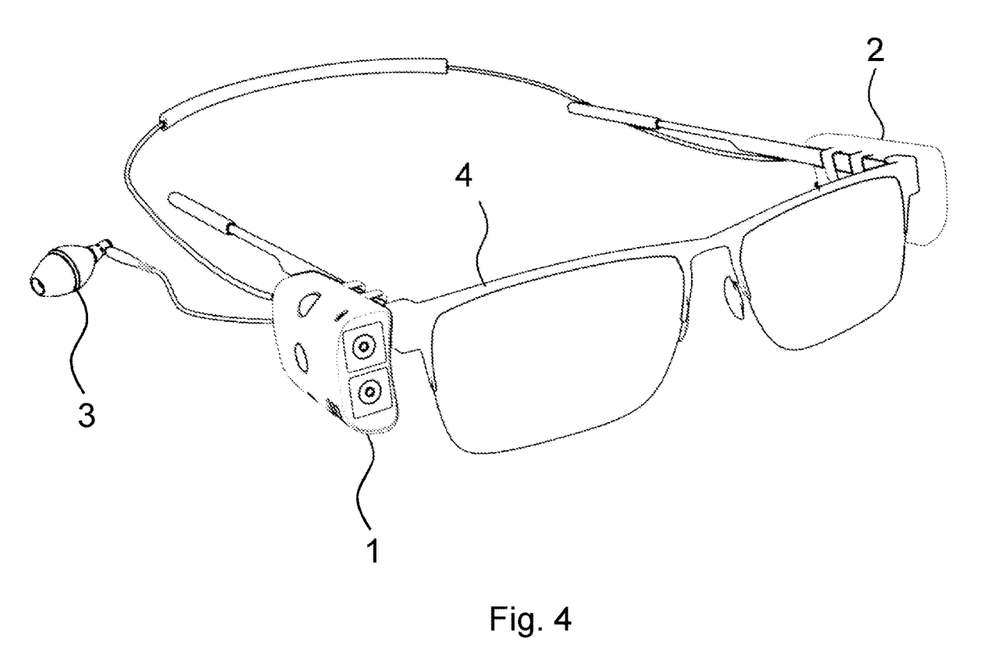
FIG. 4 is a third embodiment of the device.
Figure 5:
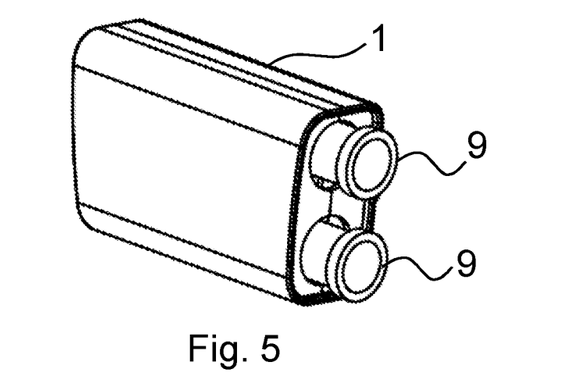
FIGS. 5 to 7 are different views of one embodiment of the stereoscopic image and/or video acquisition unit.

As an alternative the device can be composed of one or more housings coupled to the eyeglasses 4, as shown in FIG. 4, or housings to be kept on one's body connected to the visual sensors, which visual sensors are placed at the level of eyeglasses 4.

In order to couple the visual sensor to the eyeglasses coupling means 6 are used, visible in FIGS. 3 and 4, such as for example simple clips, or a magnetic mechanism, by installing beforehand a support on the eyeglasses 4. Anyway, any procedure provided by prior art of mechanical engineering can be used for creating such connection, such that the field of view of the device is almost similar to that of the user, limiting parallax effects.

As an alternative it is possible to provide the whole device, suitably miniaturized, integrated into the frame of the eyeglasses 4.

The stereoscopic or multicamera image and/or video acquisition unit 1 mentioned above can be composed of several video cameras, particularly a pair of video cameras 9, or a video camera and/or other sensors that can give the device a knowledge of the three-dimensional structure of the scene at each moment, namely in real-time, regardless of the condition of the device (namely for example it is not necessary for the device to be in motion for perceiving three-dimensionality). Said video cameras 9 can be monochromatic, RGB or of the NIR type (using near infrared).

Figure 6:
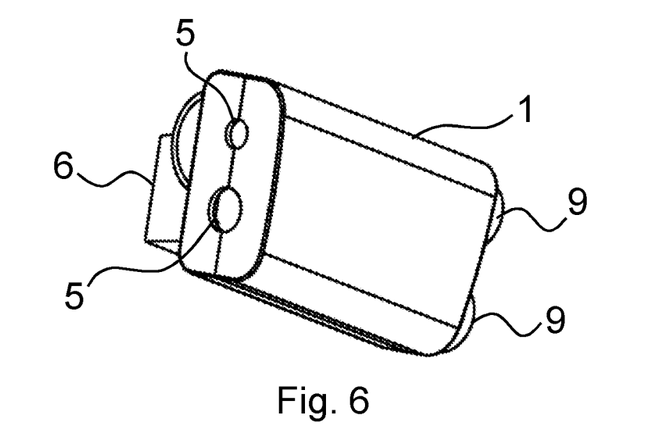
Figure 7:
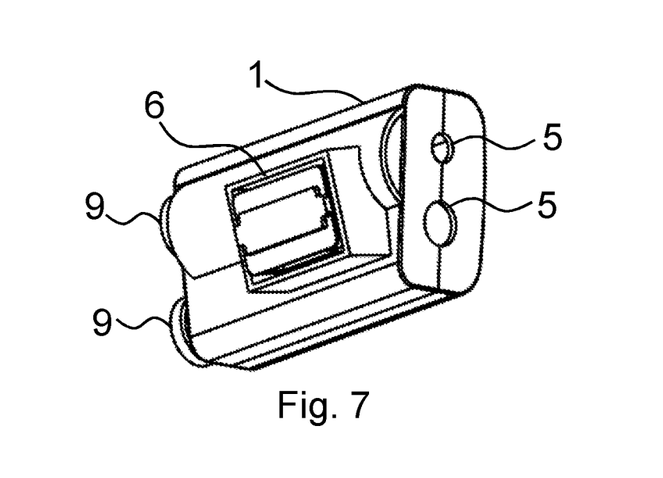

In the rear part, opposite to the video cameras 9, the housing of the visual system 1 has connectors 5, visible in FIGS. 6 and 7, for the communication with the processing unit 2.

The device is equipped with microphones connected to the processing unit, such to record and process the recorded sounds for interpreting the user's commands. This speech recognition operation can take place both on the main processing unit and on dedicated cards. The presence of several microphones can be used for carrying out noise reduction techniques, such to further highlight the user's voice with respect to other present noises.

The device can give an auditive feedback to the user, namely it can communicate with him/her, through earphones 3, as shown in FIG. 4, or by bone conduction systems.

Figure 8:
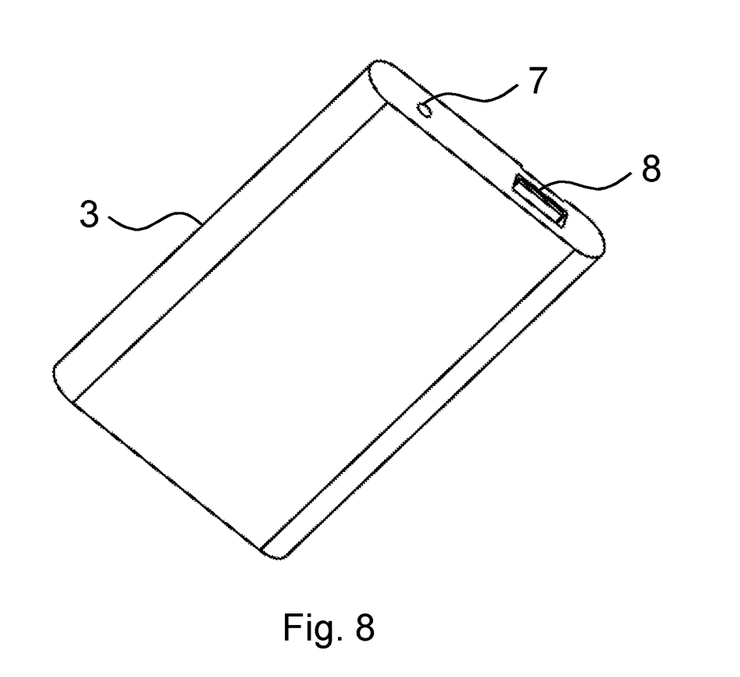
FIGS. 8 and 9 are two views of a variant embodiment of the processing unit.
Figure 9:
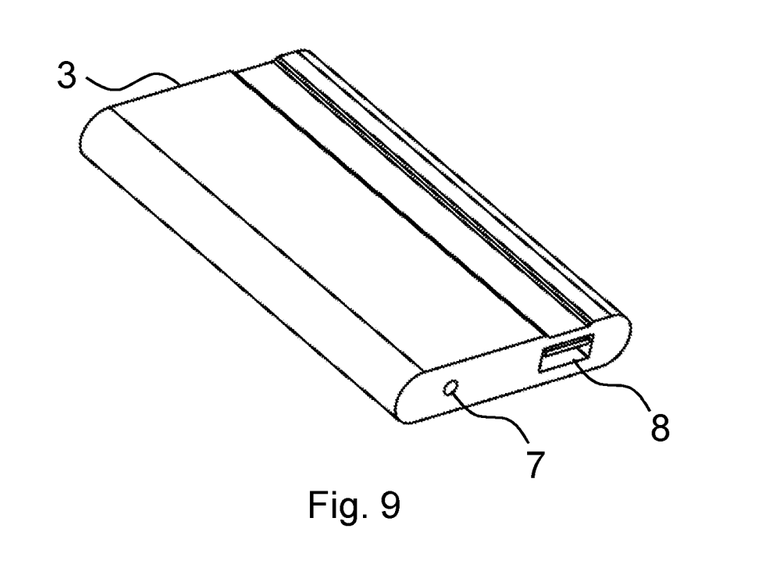

The processing unit 2 can be contained within an housing mountable on the eyeglasses 4, as shown in FIG. 4, or within a separated unit, as shown in FIGS. 8 and 9, that has dimensions comparable with a mobile phone and that therefore can be carried within the pocket or on the waistband.

The unit is provided with a connection port for input and output data, in the example in the figure a USB port 8, and one connector 7 for recharging the batteries.

Figure 10:
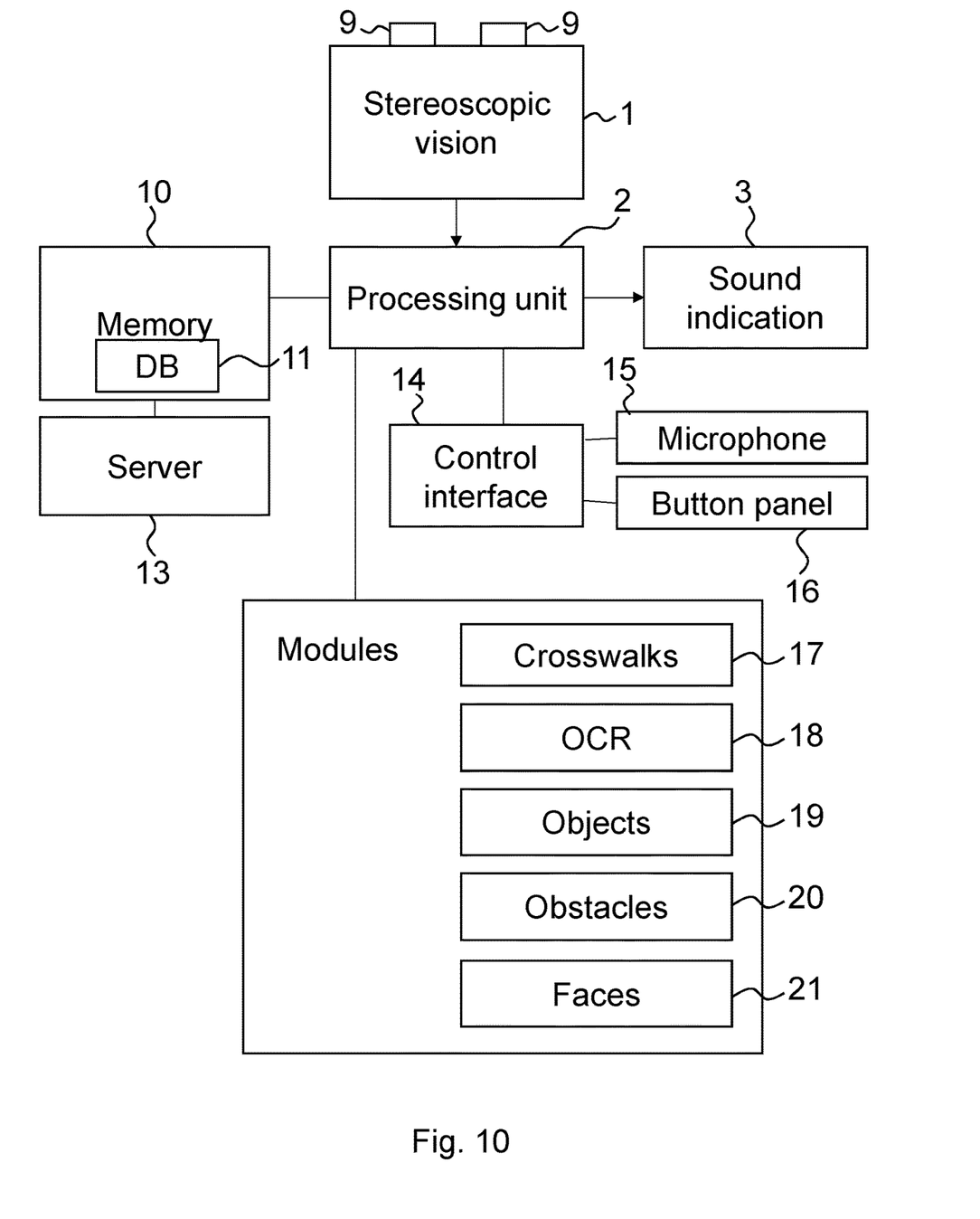
FIGS. 10 and 11 are block diagrams of the device and of the process.

FIG. 10 shows a functional block diagram of the device, where the stereoscopic or multicamera image and/or video acquisition unit 1 captures a scene and it sends images or videos to the processing unit 2.

The processing unit 2 processes the images and it communicates to the user processed information by means of the sound indication unit 3.

There is provided a memory unit 10 where data are saved, where a database 11 of known data is contained for object recognition. Such memory unit can be put in communication with a remote server to remotely save data or to receive updates or training of the database 11. However the connection to the server is optional and the device can work in complete autonomy.

The processing unit 2 can be set by a control interface 14 comprising a microphone 15 and a push-button panel 16, visible for example in FIG. 1.

By pressing the buttons it is equipped of, or by speech commands, it is possible to access the functionalities provided by the device.

The device is provided with means 18 for reading printed texts and communicate them to the user: it acquires images, extracting the position of possible printed texts by means of algorithms similar or equal to those present in prior art, then it performs automatic character recognizing techniques (OCR) to obtain a representation of the text and to communicate it to the user by methods described above. In case of ambiguity or in presence of several texts within the image, the device asks for user intervention for deciding which text has to be communicated, or it chooses on the basis of pre-programmed logics such as for example closeness to the fixation point. The fixation point is identified as the centre of the acquired images.

The device is provided with crosswalk recognition means 17: the device analyses acquired images, and by using dedicated algorithms, it audibly indicates to the user whether crosswalks are present or not in his/her field of vision and, if any, it can communicate their position and orientation to the user.

The device is provided with people face recognition means 21: by analyzing the acquired images, the device can determine whether a face is present in the scene or not, and then it can identify it, if it is known. This recognition procedure can use stereoscopy for distinguishing the background in the acquired images. In order to identify such face the device can use one or more classifiers specifically trained for the aim. The device can further be able to learn new faces, such to perfectly adapt itself to the life of each user. Therefore the device can keep within the database 11 the features of the known faces. Such features can for example comprise gradients, intensity, colour, texture and contrast.

The device is provided with means 19 for identifying and recognizing a plurality of objects: by analysing the acquired images the device can extract the features (some of them have been described in the previous paragraph) of the scene. For making this it can use the advantages offered by stereoscopic vision. The database 11 in this case contains features of recognizable objects. The features identified by the processing unit 2 in the acquired images are then compared with the features of the objects present in the database 11. By means of trained classifiers or differences between the features of the several objects it is possible for the device to communicate the object, if identified, to the user, and to indicate its position, allowing the user to reach it.

The device can further learn new objects and/or improve the representation of those already learnt. The start of learning procedure is decided by the user by a speech command or by pressing the buttons present on the device. Once the object to be learnt is within the field of vision of the video cameras, in order to be identified and separated from the rest of the scene the device can use techniques related to stereoscopic vision, contour analysis or colour segmentation. Thus the computation of the main features is much more accurate. Once enough features are acquired necessary to identify the object from different points of view, the device can ask the user to assign a name thereto by generating a sound. Such sound can be recorded by the device and it can be used by the device when it has to make reference to the object when talking to the user, and vice versa by the user when he/she has to make reference to the object when talking to the device. Such sound can be both recorded as it is and stored in the memory, and processed by a speech recognition motor for producing a text representation thereof, with the same purposes just mentioned.

When analysing the scene, the device can use images and video sequences acquired by several video cameras 9, as well as a time filtering thereof. Thus the accuracy of detection and classification algorithms is improved.

The device is provided with means 20 recognizing obstacles present on the path of the user. This is performed by a deep use of stereoscopy to interfere with the three-dimensional structure of the observed scene. The obstacles in the field of vision of the user (for example people, steps, protrusions, real obstacles) can be recognized and communicated to the user thus having the possibility of acting accordingly.

The device can be characterized by several operation modes: a first one, intended to reply to questions of the user about the scene such as for example the presence of crosswalks, the identification of an object held in the hands, and a second one characterized by a higher autonomy of the device, that will warn the user if something important is detected (examples: asking the device to warn the user as soon as it detects crosswalks, or asking as soon as it detects a particular object he/she is looking for in the house, etc. . . .).

With reference to classification processes mentioned above, a general learning process will be performed by presenting the stimulus to be learnt many times, such that the device can extract the essential features (such as those mentioned above). These latter will be associated to the stimulus and will be used for identifying it. As regards some classes of objects, it is possible for the device to have already in the memory a reduced database with main recognition functionalities (example: banknotes, road signs, . . . ) such to guarantee a minimum set of functionalities even when it is started for the first time.

With reference to image or video processing required by the several functionalities of the device, they can comprise, but not exclusively, disparity analysis, optical flow calculation, colour segmentation, connected components analysis, differences between frames, neural networks applications, time filtering.

The device can be connected to a personal computer by a cable, for example USB cable, or by wireless connection. Such cable, in addition to provide power supply for recharging the battery (which can take place also by means of other types of standard dedicated chargers) will allow a possible internet connection to be used for obtaining updates. In this step, the device can also communicate with a central server, such to further refine the classifiers intended to recognize people and objects (learning/improving process of the "offline" type).

Figure 11:
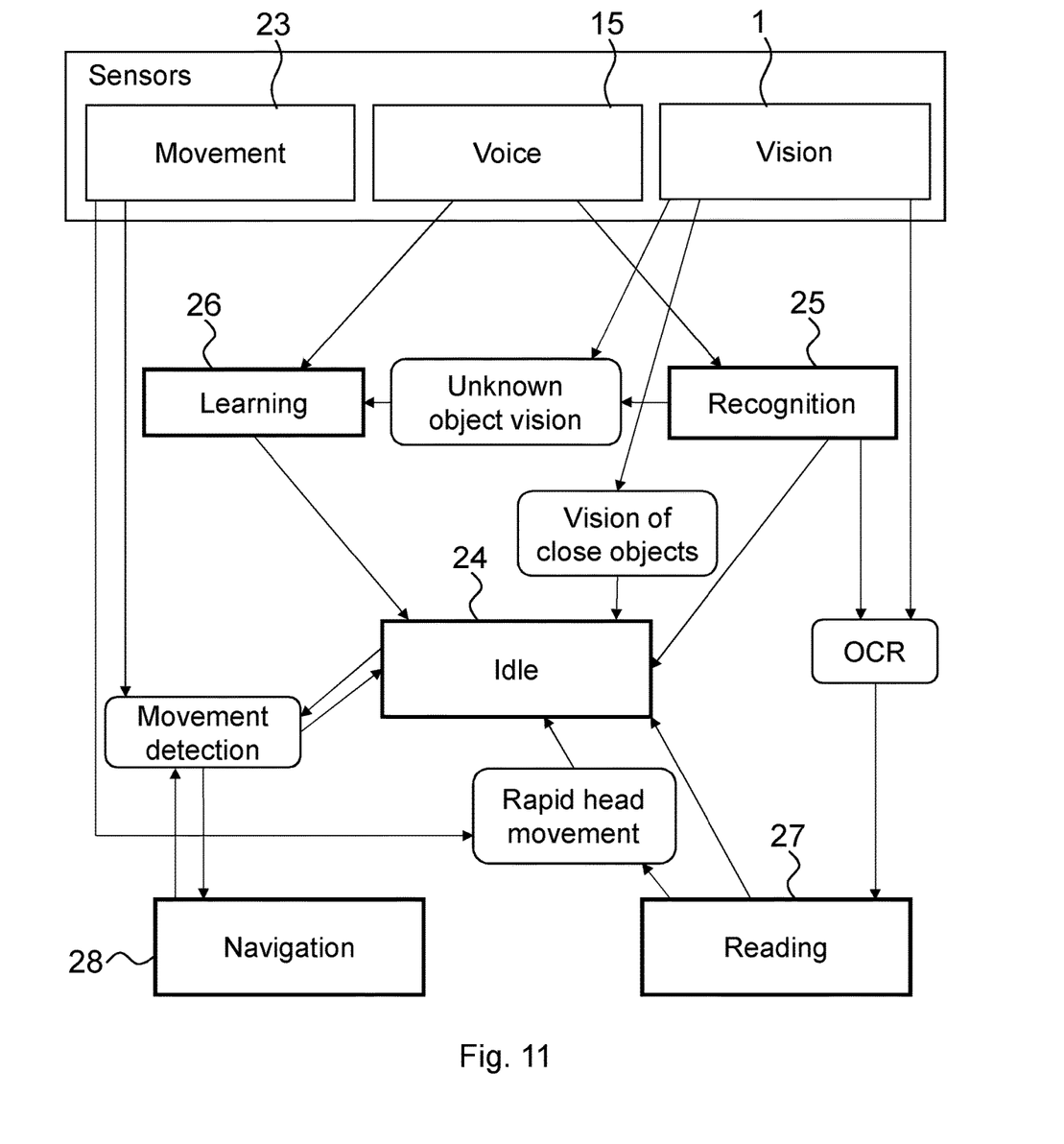

FIG. 11 shows a diagram of the process. In addition to the image and/or video acquisition unit 1, intended for the vision, further sensors are provided, particularly a voice recognition microphone 15 and a movement detection inertial sensor 23.

The device is intended to perform a plurality of functionalities, which functionalities are activated and/or deactivated for defining a plurality of device operating states alternative to each other.

Such states can be for example "Idle" 24, where the device is in standby; "Recognition" 25 where the three-dimensional scene is analysed, the objects are isolated from the background and such objects are recognized and communicated to the user; "Learning" 26, where the user provides the identity of unknown objects, that therefore are learnt by the device; "Reading" 27 where a text recognized by OCR is read to the user; "Navigation" 28 where the three-dimensional scene is monitored for detecting obstacles, crosswalks, indication of the path and the like.

A real-time analysis is performed for the signals detected by the sensors 15 and 23 and the three-dimensional structure of the scene acquired by the unit 1, and therefore the operating state is assigned or kept on the basis of the performed analysis.

From Idle state 24 it is possible to pass to Recognition state 25 when the acquisition unit 1 detects close objects. Thus the object is analysed and recognized by the device.

If the object analysed by vision is unknown the device passes to Learning state 26 where it is possible to define the object by the user's voice.

The Recognition state 25, and possibly also the Learning state 26 can be assigned by speech activation, by recognizing speech instructions of the user.

Once recognition or learning have ended, the device automatically goes back to Idle 24.

On the contrary if vision detects a text by OCR, the state passes from Recognition 25 to Reading 27, and the text is read to the user. Once the text has ended, the device automatically goes back to Idle 24.

If the inertial sensor 23 detects a rapid movement of the head, the system passes to Idle 24 and reading can then start again later. The movement is identified as a change of attention of the user from the text to a further object, for example as a reply to a call.

If the inertial sensor 23 detects a walk, acting for example as a pedometer, the Navigation state 28 is assigned. When the inertial sensor 23 detects the walk has stopped, the device automatically passes to Idle 24, and Navigation state 28 can be again activated if the user starts walking again.

The invention described in this manner is not limited as regards shape and process by the examples provided in the previous paragraph. Many variants can characterize it, starting from the shape, the anatomical position where housings are worn, the type of data processing unit and video camera used. Moreover as regards the process, the same result can be often achieved by following different approaches, therefore those provided in the description have not to be considered as limitative.

The invention claimed is:

1. A wearable device for helping a user, comprising:
at least one of an image or a video acquisition unit;
a data processor connected to the image or video acquisition unit;
an indication unit;
a sensor connected to the data processor;
wherein the image or video acquisition unit is stereoscopic or multicamera,
wherein the data processor is configured to analyze signals detected by the sensor and images or videos acquired by the image or video acquisition unit, determine the three dimensional structure of a surrounding environment and objects in said surrounding environment based on an image or video from the image or video acquisition unit, identify the object by isolating the object from the surrounding environment, and assign functionalities to the wearable device based on the analysis by the data processor,
wherein the data processor is equipped with a mass memory;
wherein said wearable device is designed to perform a plurality of functionalities, said functionalities comprising learning, idle, recognition, reading, and navigation; and
wherein the indication unit provides information to the user by non-visual display in response to the determination by the data processor.

2. The wearable device according to claim 1, wherein said sensor comprises at least one microphone.

3. The wearable device according to claim 1, wherein said sensor comprises at least one inertial sensor.

4. The wearable device according to claim 1, further comprising a database of any combination of the following: known objects, known features of known objects, alphanumeric characters associated with known objects; and a learning system for said database.

5. The wearable device according to claim 1, wherein the indication unit comprises one or more loud speakers.

6. The wearable device according to claim 5, wherein the loud speakers comprise at least one earphone.

7. The wearable device according to claim 5, wherein the loud speakers comprise a bone conduction sound system.

8. The wearable device according to claim 1, further comprising a control interface connected to the data processor, said control interface having any combination of one or more keys, one or more microphones, and a voice message recognition unit.

9. The wearable device according to claim 1, wherein the image or video acquisition unit comprises at least two video cameras arranged along a vertical axis with the wearable device in worn condition.

10. The wearable device according to claim 1, further comprising a supporting frame provided with two ends resting on the users' ears and with a connection body to be placed behind the user's nape, the acquisition unit being placed in proximity to one of the two ends.

11. The wearable device according to claim 1, wherein the wearable device is adapted to be connected to a pair of eyeglasses with a coupling system.

12. A process of operation of a wearable device for helping a user, comprising the following steps:

(a) acquiring one or more images or videos, which images, or videos representing an object and a surrounding environment;
(b) processing the images or the videos to obtain a three-dimensional structure of the object or the surrounding environment;
(c) identifying the object by isolating the object from the surrounding environment;
(d) indicating identified objects to the user;
wherein the wearable device is configured to perform functions, said functions comprising learning; idle; recognition; reading; and navigation;
(e) detecting signals with sensors;
(f) analyzing in real-time detected signals and the three-dimensional structure of the surrounding environment or the objects;
(g) assigning the functionalities of the device based on a performed analysis; and
(h) providing information to the user by non-visual display.

13. The process according to claim 12, further comprising a recording of audio signals and a processing of the user's speech to trigger one or more steps (a)-(g).

14. The process according to claim 12, wherein identifying the objects comprises any combination of the following: detecting characteristic features of an object in the image or the video; associating the detected characteristic features of the object with other characteristic features of the object or known characteristic features of known objects; and
grouping the characteristic features together in homogeneous groups.

15. The process according to claim 12, further comprising the step of providing a system managing a database of known objects, and a system for learning said objects.

16. The process according to claim 12, wherein the identified objects are classified by the wearable device with one or more classifiers with reference to a database, further comprising a step of learning unknown identified objects by storing characteristic features of said unknown identified objects in said database.

17. The process according to claim 16, wherein, for each unknown identified object, the user is asked to pronounce a name of the unknown identified object, and the pronounced name is associated with stored characteristic features, and alphanumeric characters.

18. The process according to claim 12, wherein the objects isolated from the surrounding environment are analyzed and associated with alphanumeric characters, said alphanumeric characters being automatically identified and read to the user by means of OCR (Optical Character Recognition).

19. The process according to claim 18, wherein, if a plurality of groups of alphanumeric characters is present, a priority value is assigned to each group based on criteria that include a distance of the group from a fixation point, a distance of the group from the user, or a dimension of a font, and wherein the group of characters are read in priority order.

20. An eyeglass frame for helping a user, said eyeglass frame having side arms and a wearable device integrated in said side arms, wherein:
(a) the wearable device is constructed according to claim 1; and
(b) the eyeglass frame is adapted to perform a process based on stereoscopic or multicamera vision, which comprises:

acquiring one or more images or videos, which images, or videos representing surrounding environment or an object;

processing the images or the videos to obtain the three-dimensional structure of the surrounding environment or the object;

identifying the objects in the surrounding environment by isolating the objects from the surrounding environment;

indicating identified objects to the user;

wherein the wearable device is configured to perform one or more of functions, said functions being selected from learning; idle; recognition; reading; and navigation;

detecting signals with sensors;

analyzing in real-time detected signals and the three-dimensional structure of the surrounding environment or the objects; and assigning the functionalities of the device based on a performed analysis.

21. The wearable device according to claim 1, wherein the data processor is configured to automatically assign functionalities to the wearable device, such functionalities comprising learning and two or more of the following: idle; recognition; reading; and navigation.

22. The wearable device according to claim 1, wherein the data processor is mountable in the wearable device.

23. The process according to claim 12, wherein the processing of the images or the videos takes place in the wearable device.

24. The eyeglass frame according to claim 20, wherein the processing of the images or the videos takes place in the wearable device.

* * * * *